March 18, 1947.  A. C. HOOF  2,417,494
VALVE END SEAL
Filed Aug. 24, 1942
Fig. 1.
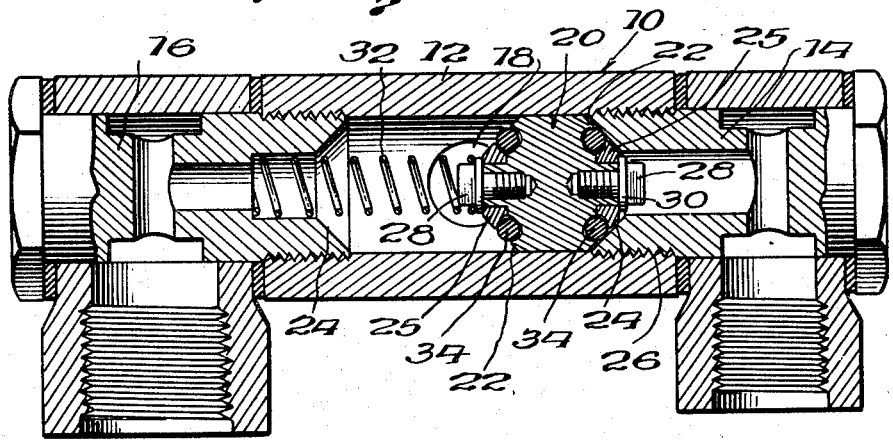
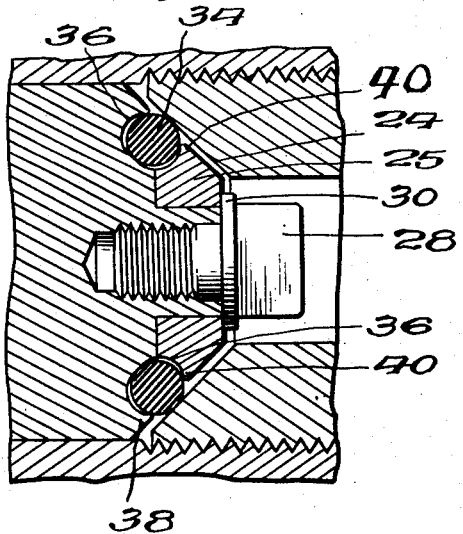
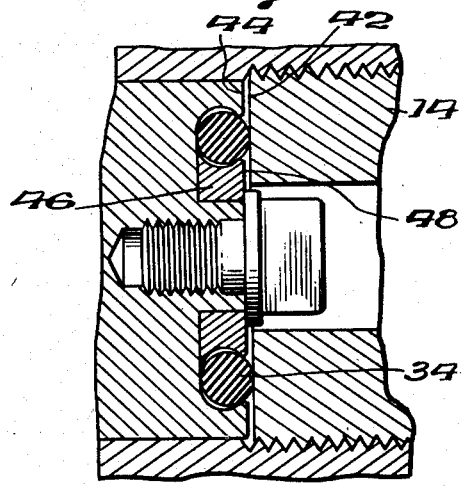
Fig. 2.  Fig. 3.
Inventor
A. C. Hoof
By A. M. Houghton
Attorney Patented Mar. 18, 1947

2,417,494

UNITED STATES PATENT OFFICE 2,417,494

VALVE END SEAL

Addison C. Hoof, Hinsdale, Ill.; Frances A. Hoof, Hugh C. Kepner, and Walter Eckert, executors of said Addison C. Hoof, deceased, assignors to Hoof Products Company, Chicago, Ill., a corporation of Illinois Application August 24, 1942, Serial No. 455,939

1 Claim. (Cl. 251—160)

The present invention relates to an end seal for a valve or fluid cut-off mechanism.

Yet, more particularly, the invention contemplates a valve seal for check, pressure relief and shuttle valves adapted to selectively seal an outlet opening against relatively extreme fluid pressures. Such constructions conventionally comprise a movable valve member relatively axially shiftable toward another valve member, the sealing means being located adjacent opposed axial faces of the two valve members. With such constructions it has been observed that the fluid tends to leak laterally past the sealing member under extreme pressures due, presumably, to the lateral distortion of the resilient seal. This distortion is enhanced by virtue of the fact that the device operates alternately between open and closed position, whereby the fluid under pressure trapped behind the sealing member may tend to further distort the seal and urge it out of its retaining means when the members are relatively shifted to valve-open position. It has also been observed that the resilient sealing members utilized in the hydraulic devices of the present class tend to vary in dimension, that is, to swell, further complicating the maintenance of the elements in predetermined cooperative relationship. Moreover, a repeated number of operations, particularly at high pressure and under the disadvantageous conditions hitherto mentioned, tends to result in fatiguing of the material.

It is accordingly a particular object of the present invention to provide a valve sealing construction of the foregoing type which obviates the foregoing difficulties and is operative to function a practicably unlimited number of times to prevent the leakage of hydraulic fluid pressures of extremely high order.

A further object of the present invention contemplates the provision of a valve sealing construction as above, wherein the sealing member cooperates with a rigid metallic surface to prevent overloading of the resilient seal by limiting the effective operative pressure to a substantially fixed predetermined amount when the valve is in closed position.

Among other objects of the present invention are to provide construction as above in which the sealing member is retained against displacement from its mounting in spite of the repeated alternate subjection to operative conditions, while at the same time permitting the member to swell or expand within reasonable limits, in accordance with the known characteristics of the materials available for this purpose; to provide an end seal as above which obviates detrimental fatigue by preventing application of excess pressures; to further provide a construction as above having a resilient sealing member normally uncompressed but subjected to working pressures when the valve is moved to closed position for the purpose of enhancing the sealing action and working the resilient material to maintain its elasticity. Yet, other and further objects will be apparent from a consideration of the following drawings and specification wherein Fig. 1 is a sectional view taken centrally through a valve construction embodying the features of the present invention;

Fig. 2 is a detailed sectional view of a portion of the structure shown in Fig. 1;

Fig. 3 is a detailed sectional view of a slightly modified construction.

Referring now to Figs. 1 and 2, wherein one preferred form of construction is shown for the purpose of illustrating the principles of the present invention, the numeral 10 represents a so-called shuttle type of valve body, the details of which are more completely described in my copending application Serial No. 415,618, filed August 18, 1941 which issued as Patent No. 2,371,293 on March 13, 1945. In accordance with this construction there is provided a main cylindrical body section 12 provided with inlet fittings 14 and 16 at either extremity. A centrally disposed outlet 18 is adapted to be supplied selectively from either inlet fitting depending upon the operative location of internal shuttle valve element 20.

The shuttle valve element 20 is a substantially cylindrical member disposed for free shiftable movement within the bore of the cylinder 12, its opposed axial faces being tapered or inclined as at 22. It will be noted that the inclined faces are in reality valve surfaces which cooperate with complementary inclined conical surfaces 24 on the inlet fittings 14 and 16. To this end the inlet fittings are provided with inwardly extending cylindrical portions threadedly engaging the body 12 as at 26. The concave coned surfaces 24 accordingly form an axial extremity of each of the fittings and are preferably machined or ground to cooperate in sealing relation with the opposed surfaces 22.

Attention is particularly directed to the fact that the radially inwardly disposed section of the inclined or tapered surfaces 22 is disposed upon a separable portion 25 of the cylindrical shuttle member which takes the form of an annular ring receivable upon a complementary shoulder portion of the shuttle shown. This ring additionally co-acts to retain in position a resilient sealing member, as will hereinafter appear more in detail, and is locked in place by machine screw 28 having a shoulder 30 which axially embraces the ring 26. As shown clearly in Fig. 1, the shoulder upon one of the fasteners 28 forms an ideal seat for a helical coil spring 32 acting against the inlet fitting 16, as shown, and normally holding the shuttle valve to the right, as viewed in the figure.

Intermediate within each of the ground tapered surfaces 22 of the shuttle members is disposed a resilient elastic sealing ring 34 of circular cross-section. Particular attention is directed to the fact that the sealing ring is disposed within a recess provided within the body of the shuttle member 20 and the associated removable holding ring 25. It will be seen that the separable members, that is, the shuttle member 20 and the removable holding ring 25, when assembled, form the recess for the resilient sealing member, and also provide a restricted aperture through which a minor portion of the resilient sealing member protrudes. In particular it should be noted that the recess possesses a dimension in a direction normal to the surface 22 which is substantially less than the diameter of the resilient member 34, whereby an arcuate surface portion of the resilient member projects outwardly beyond the surface 22, representing a convex configuration operative for impingement upon the opposed surface 24. In a lateral direction, parallel to the surface 22, the recess, however, is substantially elongated having a dimension materially greater than the normal diameter of the ring 34 and providing spaces 36 between the lateral surfaces of the ring and the walls of the confining recess. The ring, however, is permanently disposed within the recess, being retained by inwardly extending lips 38 and 40 formed on the main shuttle body member and the holding ring 25 respectively. In short, the sealing ring is disposed within a recess having an outwardly open face permitting a curved section of the resilient member to project therefrom, while supporting the inner surface of the ring and permitting free lateral expansion.

From the foregoing it will be apparent that in operation the shuttle valve normally resides in the position shown in Figs. 1 and 2 wherein the left-hand-most resilient ring 34 is substantially undistorted and uncompressed, the opposite ring being subjected only to the pressure of spring 32. Upon the application of a high pressure through the inlet fitting 16, however, it will be apparent that the surfaces 22 and 24 move into cooperative relationship, thus compressing the ring 34 until its outwardly projecting portion is flattened into the plane of the surfaces 22 and 24. At this time, it will be seen, the ring abuts the surface 24 with a predetermined pressure to seal the valve surface against egress of fluid, and further that the expansion of the resilient ring is at right angles to the applied pressure.

At times, when it becomes necessary or desirable to utilize fluid pressure from the source connected with the inlet fitting 14, it will be apparent that the application of a superior pressure at this point will result in the shuttle member shifting to the left-hand-most position in cooperation with the inlet fitting 16 and thus sealing off this inlet in exactly the same manner as before.

In Fig. 3 there is illustrated a somewhat modified form of construction wherein the cooperating valve surfaces are disposed in a plane normal to the axis of the shuttle valve. The extremity of the fitting 14 is provided with flat, machined or ground surface 42, whereas the opposed extremity of the shuttle has a complementary surface 44 and the holding ring 46 is comparatively configurated to provide an outer surface 48 disposed in the same plane as surface 44.

The foregoing constructions have been found effective to withstand and indefinitely seal off hydraulic pressures frequently approaching the bursting pressures of metallic structures. Attention is particularly directed to the fact that operation is equally effective after an indefinite number of actuations indicating that the construction has the valuable advantage of eliminating fatigue in the resilient member. So, also, it has been found that release and alteration of pressure during operation of the device does not tend to release the resilient ring from its recess, as has been the case with other constructions with which I am familiar.

While it is impossible, due to the impracticability of observing the internal action, to account for the improved operation of the device, nevertheless it is conceived that the reception of the freely yieldable ring within its recess affords novel cooperation between the sealing member and the valve surfaces 22 and 24. In other words, the protruding portion of the ring 34, by virtue of its convex configuration, is freely shiftable into the recess provided therefor, being laterally expansible to accommodate this distortion. With the parts so disposed and under the influence of high pressures acting against the free end of the shuttle part, the pressure fluid leaking about the shuttle apparently acts upon the resilient ring to urge it cooperatively against the opposite side of its recess and the opposed valve surface 24. Upon release of the pressure it appears that pressure fluid within spaces 36 of the recess is permitted to leak outwardly without tending to displace the resilient ring. In any event, the effect of the foregoing novel construction is to provide a valve having vastly improved and surprisingly utilitarian characteristics over those constructions with which I have been hereto familiar.

It will be appreciated from the foregoing that the resilient ring 34 may comprise any suitable rubber-like material and where the hydraulic fluid employed tends to attack rubber it is preferable to utilize a suitable resistant material such, for example, "Neoprene," Buna-S, Buna-N, "Thioxol" and the like. It will be further appreciated that the foregoing valve type is selected only for purposes of exemplification and that the invention is equally applicable to all valve structures requiring sealing construction between the axial extremities of relatively shiftable valve members. So also it is not necessary to incorporate the yieldable ring in the shuttle since it may be associated with a relatively fixed valve member where desired. This alternative structure is broadly a reversal of that illustrated above.

What I claim is:

A valve comprising two relatively movable members one of which is provided with a recess the axis of which at right angles to the direction of applied pressure is elongated to a dimension greater than the diameter of a recess-held packing to permit packing expansion along such major axis, and the axis of which parallel to the direction of applied pressure is restricted to a dimension less than the diameter of such recess-held packing to prevent packing expansion along such minor axis, the recess having a circumferential aperture at the valve face of a dimension less than the diameter of such packing to prevent packing displacement but permit packing protrusion; and a resilient packing in the recess permanently held against displacement and substantial movement along the restricted minor axis but free to expand along the elongated major axis of the recess, a portion of said packing protruding always through the circumferential aperture of the recess to provide a constant compressible sealing contact area.

ADDISON C. HOOF.

REFERENCES CITED

The following references are of record in the file of this patent:

UNITED STATES PATENTS

| Number | Name | Date |
|---|---|---|
| 874,652 | Bailey | Dec. 24, 1907 |
| 2,263,750 | Wilke | Nov. 25, 1941 |
| 2,107,200 | Kennon | Feb. 1, 1938 |
| 2,115,383 | Christensen | Apr. 26, 1938 |
| 986,439 | Camp | Mar. 14, 1911 |
| 2,307,828 | Eggleston | May 1, 1942 |
| Re. 16,071 | Dorsey | May 19, 1925 |
| 1,686,310 | Beebe | Oct. 2, 1928 |
| 1,791,449 | Kennedy | Feb. 3, 1931 |
| 2,353,161 | Heigis | July 11, 1944 |
| 1,469,585 | McCune | Oct. 2, 1923 |
| 2,115,383 | Christensen | Apr. 26, 1938 |
| 2,263,750 | Wilke | Nov. 25, 1941 |

FOREIGN PATENTS

| Number | Country | Date |
|---|---|---|
| 12,911 | British | June 7, 1904 |
| 40,549 | German | 1887 |
| 9,164 | British | June 22, 1915 |
| 177,010 | Swiss | Aug. 1, 1935 |